US011858277B2

(12) United States Patent
Hernandez Creus et al.

(10) Patent No.: US 11,858,277 B2
(45) Date of Patent: Jan. 2, 2024

(54) ROTATING HOUSING WITH SENSOR

(71) Applicant: Hewlett-Packard Development Company, L.P., Spring, TX (US)

(72) Inventors: Jordi Hernandez Creus, Sant Cugat del Valles (ES); Marta Coma Vives, Sant Cugat del Valles (ES); Javier Chavarria Roe, Sant Cugat del Valles (ES); Jose Maria Rio Doval, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 381 days.

(21) Appl. No.: 17/419,530

(22) PCT Filed: Apr. 29, 2019

(86) PCT No.: PCT/US2019/029643

§ 371 (c)(1),
(2) Date: Jun. 29, 2021

(87) PCT Pub. No.: WO2020/222740

PCT Pub. Date: Nov. 5, 2020

(65) Prior Publication Data

US 2022/0080739 A1 Mar. 17, 2022

(51) Int. Cl.
*B41J 2/175* (2006.01)

(52) U.S. Cl.
CPC ......... *B41J 2/17566* (2013.01); *B41J 2/1752* (2013.01); *B41J 2002/17573* (2013.01)

(58) Field of Classification Search
CPC .. B41J 2/1752; B41J 2/17546; B41J 2/17566; B41J 2/20; B41J 2002/17573
See application file for complete search history.

(56) References Cited

U.S. PATENT DOCUMENTS

| | | | | |
|---|---|---|---|---|
| 6,213,580 | B1 | 4/2001 | Segerstrom et al. | |
| 6,454,381 | B1 | 9/2002 | Olsen et al. | |
| 6,517,266 | B2 | 2/2003 | Saund | |
| 7,278,721 | B2 * | 10/2007 | Shimizu | B41J 2/17546 347/49 |
| 7,690,778 | B2 | 4/2010 | Cai et al. | |
| 7,841,712 | B2 | 11/2010 | Muyskens et al. | |
| 9,028,027 | B2 | 5/2015 | Bell et al. | |

(Continued)

FOREIGN PATENT DOCUMENTS

| | | | |
|---|---|---|---|
| CN | 1103031 | A | 5/1995 |
| CN | 1419496 | A | 5/2003 |

(Continued)

*Primary Examiner* — Anh T Vo

(57) ABSTRACT

A printing apparatus is disclosed. The printing apparatus comprises a rotating housing comprising a wall with an inner side defining a chamber and an outer side. The wall has a bore communicating the inner side and the outer side, and the chamber is to receive a fluid container. The printing apparatus also comprises a fix frame holding the rotating housing. The printing apparatus further comprises an optical sensor comprising an emitter to issue a detecting optical signal through the bore and a receiver to receive a detected optical signal associated to the detecting optical signal. The detected signal is sent to a controller to determine whether the fluid container is present in the rotating housing.

15 Claims, 4 Drawing Sheets

(56) References Cited

U.S. PATENT DOCUMENTS

| | | | | |
|---|---|---|---|---|
| 9,862,218 | B2 | 1/2018 | Bianchi | |
| 2007/0291076 | A1 | 12/2007 | Seki et al. | |
| 2009/0122092 | A1 | 5/2009 | Hatasa et al. | |
| 2013/0307906 | A1 * | 11/2013 | Ishizawa | G03G 15/0863 347/50 |
| 2018/0361752 | A1 | 12/2018 | Baker et al. | |

FOREIGN PATENT DOCUMENTS

| | | | |
|---|---|---|---|
| CN | 201333835 | Y | 10/2009 |
| CN | 103419497 | A | 12/2013 |
| CN | 107933099 | A | 4/2018 |
| CN | 108349268 | A | 7/2018 |
| EP | 2399748 | A1 | 12/2011 |
| EP | 3341200 | | 7/2018 |
| JP | 02198861 | | 8/1990 |
| SU | 66014 | | 11/1945 |
| WO | 2018186878 | | 10/2018 |

* cited by examiner

ROTATING HOUSING WITH SENSOR

BACKGROUND

Inkjet printers are systems that generate a printed image by propelling printing liquid through nozzles onto printing media locations associated with virtual pixels. The printing liquid drops may comprise pigments or dyes disposed in a liquid vehicle. In some examples, the printing fluid may be stored in a printing fluid container.

For some printing fluids, it may be beneficial to move them regularly due to the nature of the printing fluid composition, e.g., due to a high presence of pigments that may settle. Therefore, failing to do so may lead to deficient print job quality or image quality (IQ).

BRIEF DESCRIPTION OF THE DRAWINGS

The present application may be more fully appreciated in connection with the following detailed description taken in conjunction with the accompanying drawings, in which like reference characters refer to like parts throughout and in which.

DETAILED DESCRIPTION

Figure 1B:
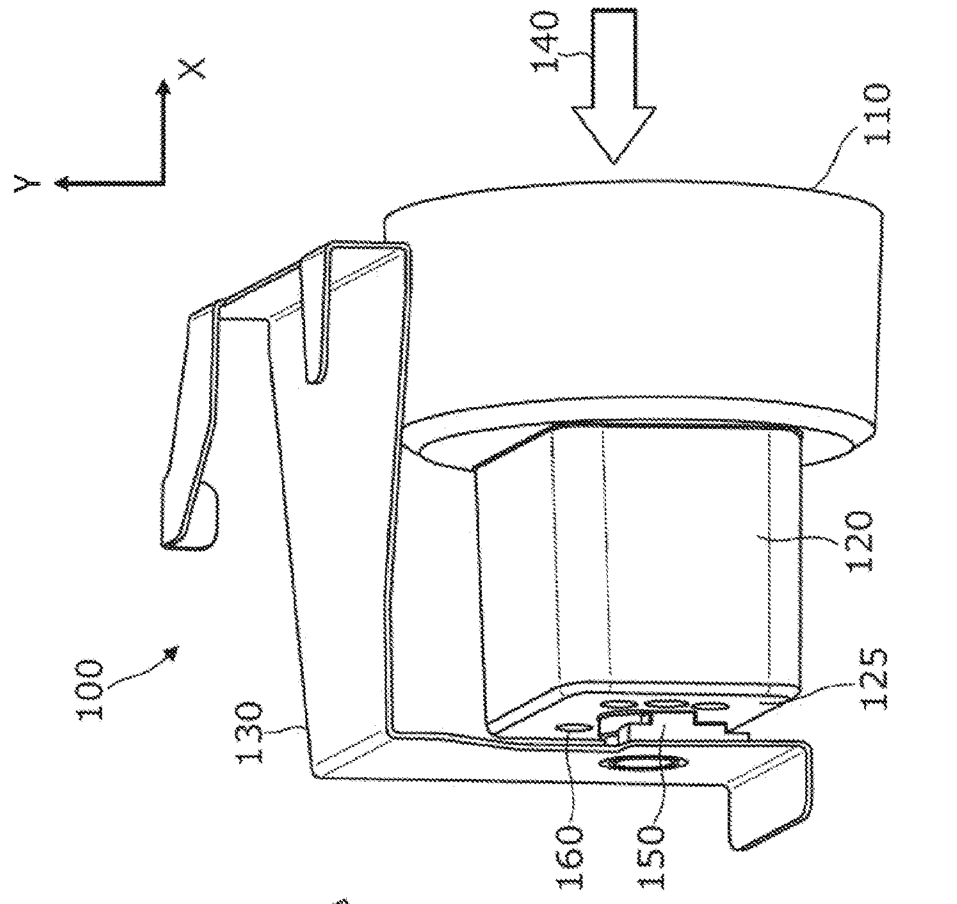
FIG. 1B is an example of a top view of an apparatus comprising a rotating housing.

The following description is directed to various examples of the disclosure. In the foregoing description, numerous details are set forth to provide an understanding of the examples disclosed herein. However, it may be understood by those skilled in the art that the examples may be practiced without these details. While a limited number of examples have been disclosed, those skilled in the art may appreciate numerous modifications and variations therefrom. It is intended that the appended claims cover such modifications and variations as fall within the scope of the examples. Throughout the present disclosure, the terms "a" and "an" are intended to denote at least one of a particular element. In addition, as used herein, the term "includes" means includes but not limited to, the term "including" means including but not limited to. The term "based on" means based at least in part on.

In the present disclosure reference is made to a printing system, printing apparatus, printing device, and/or printer. The terms "printing system", "printing apparatus", "printing device", and/or "printer" should be read in their broad definition, therefore being any image recording system that uses at least one printhead. In an example, the printing apparatus may be a two-dimensional (2D) desk printer. In another example, the printing apparatus may be a 2D large format printer. In another example, the printing apparatus may be a printing press, for example, an offset printing press. In yet another example, the printing apparatus may be a three-dimensional (3D) printer and/or an additive manufacturing system.

Some examples of printers comprise a plurality of nozzles distributed across a single or a plurality of printheads, wherein each nozzle is assigned to a single printing fluid. In the present disclosure, the term "nozzle" should be interpreted as any cylindrical or round spout at the end of a pipe, hose, or tube used to control a jet of printing fluid.

The plurality of nozzles may eject a printing fluid. In an example, the printing fluid may comprise a colorant and/or dye with a liquid carrier; e.g., cartridges and/or liquid toners. Some printing fluids may be dye based printing fluids, where dyes may be understood as a coloring solution. Other printing fluids may be pigment based printing fluids, where pigments may be understood as coloring particles in suspension. In another example, the printing fluid may comprise ink particles and an imaging oil liquid carrier; e.g., liquid toner ink commercially known as HP ElectroInk from HP Inc. In another example, the printing fluid is an additive manufacturing fusing agent which may be an ink-type formulation comprising carbon black, such as, for example, the fusing agent formulation commercially known as V1Q60A "HP fusing agent" available from HP Inc. In an additional example such a fusing agent may additionally comprise an infra-red light absorber. In another additional example, such a fusing agent may additionally comprise a visible light absorber. In yet another additional example such fusing agent may additionally comprise a UV light absorber. Examples of inks comprising visible light enhancers are dye-based colored ink and pigment-based colored ink; e.g., inks commercially known as CE039A and CE042A available from HP Inc. In yet another example, the printing fluid may be a suitable additive manufacturing detailing agent; e.g., formulation commercially known as V1Q61A "HP detailing agent" available from HP Inc. A plurality of examples of the printing fluid that may be propelled by a nozzle has been disclosed, however any other chemical printing fluid comprising an agent in a liquid solvent or in a liquid carrier that may evaporate in contact with ambient air may be used without departing from the scope of the present disclosure.

As mentioned above, in some cases, the printing fluid container comprising some printing fluids may be desired to move regularly due to the nature of the printing fluid composition. Failing to do so may lead to deficient print job quality or image quality (IQ). Some of these printing fluids may comprise composition with heavy and/or big particles which may deposit at the bottom of the container by the effect of gravity. As an example, some printing fluids comprising white pigments may be wanted to be in movement, which may be either a constant or a periodic movement, since the white pigments size is big (e.g., particle size of about 275 microns) as opposed to some other color pigments size (e.g., particle size of about 140 microns).

Figure 1A:
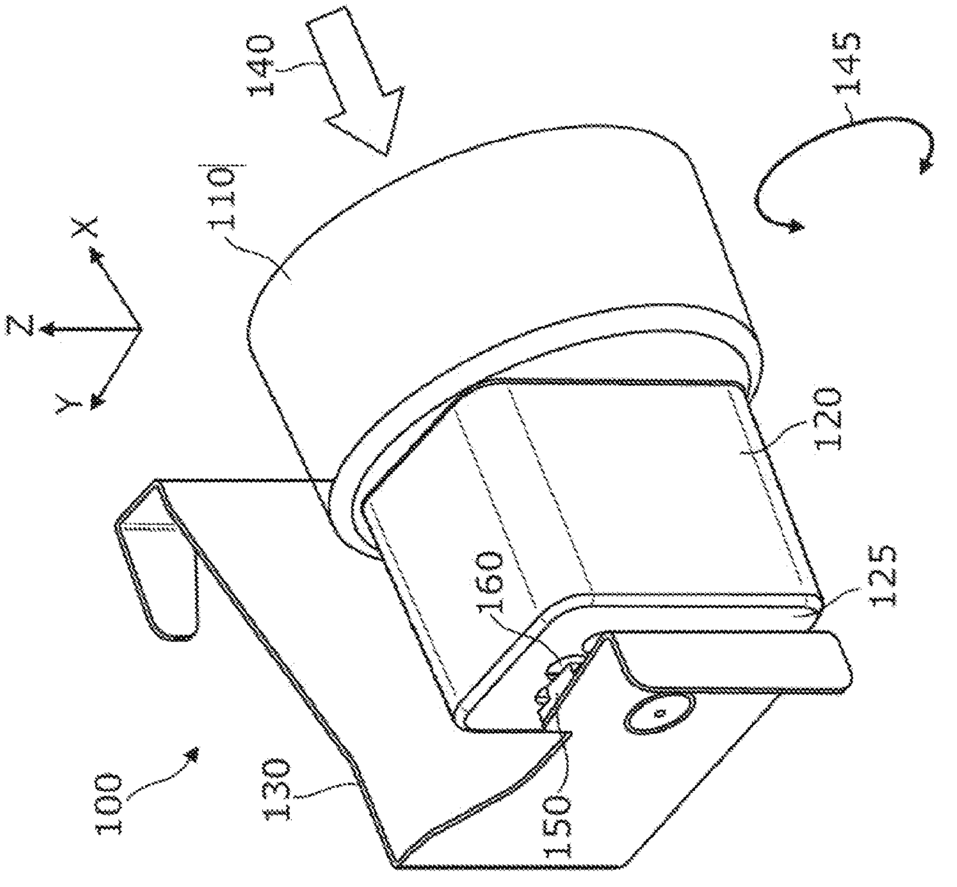
FIG. 1A is an example of an isometric view of an apparatus comprising a rotating housing.

Referring now to the drawings, FIGS. 1A and 1B are a diagram illustrating an example of an apparatus 100 comprising a rotating housing. FIG. 1A is an example of an isometric view of the apparatus 100. FIG. 1B is an example of a top view of the apparatus 100.

The apparatus 100 comprises a rotating housing 110 or rotating wheel. The rotating housing comprises a side wall 120 and a back wall 125. The rotating housing comprises an open end (i.e., opening) at the opposite side from the back wall 125 indicated by arrow 140. In the illustration example of FIGS. 1A and 1B, the rotation housing walls are designed as a composition of a rectangular prism and a cylindrical prism. However, many other shapes could be used to define the rotating housing 110 walls. In an example, the rotating housing 110 walls may be designed as a rectangular prism. In another example, the rotating housing 110 may be designed as a circular prism.

In some examples, the side wall 120 and the back wall 125 are different walls and, thereby, the side wall 120 and the back wall 125 may be formed from different material, thickness, pattern, finishing, and the like. In other examples, the side wall 120 and the back wall 125 are the same wall, thereby being formed from the same material, thickness, pattern, finishing, and the like.

The side wall 120 and the back wall 125 have an inner side and an outer side. At least a wall from the rotating housing (e.g., back wall 125), comprises a bore 160 communicating the inner side and the outer side. The bore may have any cross-section pattern, for example, circular, squared, triangular, pentagonal, and the like. The inner side of the walls of the rotating housing 110 defines a chamber comprising a volume therein. The chamber is to receive a fluid container through the opening section indicated by the arrow 140.

In the examples herein, a printing fluid container or fluid container, may comprise any repository capable of containing an amount of liquid printing fluid. In an example, the printing fluid container may be a printing fluid supply, capacity of which may range from about 2 liters to about 10 liters, for example, 5 liters. In another example, the printing fluid container may be a printing fluid supply, capacity of which may be over 10 liters. In another example, the printing fluid container may be a printing fluid supply, capacity of which may be less than 2 liters, for example 1 liter. In other examples, the printing fluid container may comprise a printhead containing an amount of printing fluid. In other examples, the printing fluid container may comprise a receptacle containing slots suitable for the introduction of a plurality of printheads container an amount of printing fluid.

The apparatus 100 also comprises a fix frame 130 to hold the rotating housing 110 so that the rotating housing 110 can rotate. In the present disclosure, the term fix frame may be used as a reference to interpret the rotation of the rotation housing 100 element, which rotates with respect to the fix frame. The rotating housing 110 may rotate clockwise and/or counterclockwise with respect to axis X. The rotating housing 110 may rotate as indicated with arrow 145. The fix frame 130, however, is static and may be attached to a structure. In one example, the fix frame may be attached to a wall of a container to store the apparatus 100 therein. In another example, the fix frame 130 may be attached to an image recording system or printer. In some examples, the fix frame 130 has a contact point with the back wall 125 from the rotating housing 110. Additionally, the contact point between the back wall 125 and the fix frame 130 is designed in such a way that it reduces the friction and other movement opposing strengths between the back wall 125 and the frame 130.

The apparatus 100 also comprises an optical sensor 150. The optical sensor 150 may be a single element or a plurality of elements. The optical sensor 150 may be any device capable of emitting and/or receiving light beams and to detect the beam intensity from the received light beams. The optical sensor 150 comprises an emitter to issue a detecting optical signal through the bore 160. The optical sensor 150 also comprises a receiver to receive a detected optical signal associated to the detecting optical signal. In the examples herein, the term "detecting signal" may be referred to as the signal emitted by an emitter, and the term "detected signal" may be referred to as the signal received by a receiver and is associated to the detecting signal. In additional examples, the sensor may be a sensor other than an optical sensor, for example a hall-effect sensor.

In an example, the detecting optical signal may be a light beam emitted from the emitter that is to travel through the bore 160 and to the chamber defined by the inner wall of the rotating housing 110. In another example, the detecting signal may be a light beam emitted from the emitter that is to travel through the chamber and to the bore 160. In the example that there may not be any fluid container in the chamber, the light beam may travel all the way through the opening indicated by arrow 140. In the example that there is a fluid container in the chamber, the light beam may be blocked by a wall from the housing of the fluid container at a predetermined distance and reflected to the receiver. In other examples, the light beam may be blocked by the back wall 125 of the rotating housing 110 due to its rotation.

In an example, the light beam emitted by the emitter and the reception or lack of reception of a light beam by the receiver may be used to determine the position of the rotating housing 110. In an example, the bore 160 may be designed in such a way that the bore 160 is associated with a predetermined position (i.e., predetermined orientation) of the rotating housing 110, for example, a vertical position. In the example, the vertical position may be the position in which a fluid container may be installed (e.g., load position). In an example, as the rotating housing 110 rotates, the detecting signal may be blocked and reflected at the back wall 125 from the rotating housing 110, the reflection of which may be received by the receiver and may be used as a detected signal. The intensity of the detected signal is indicative that the rotating housing 110 is not in the predetermined position of the rotating housing 110. In another example, as the rotating housing 110 rotates, the detecting signal may not be blocked by the back wall 125 from the rotating housing 110 and may travel through the bore 160. Based on the presence of the fluid container in the chamber, the receiver may (or may not) receive a reflected beam as detected optical signal, being the detected optical signal indicative of the presence of the fluid container in the chamber. The detected optical signal reflected from the back wall 125 may have a different intensity than other detected optical signals, thereby being indicative of different situations (e.g., rotating housing 110 not in the predetermined—vertical—position, fluid container installed in the chamber, etc.).

Based on the previous examples, the reception of lack of reception of a light beam by the receiver may be used to determine whether the fluid container is present in the rotating housing 110. In one of the examples above, if the chamber does not have a fluid container therein, the light beam may not be reflected back through the opening and not received by the receiver thereby the lack of reception of the light beam being indicative of an empty chamber. In another example, if there is a fluid container in the chamber, the light beam may be blocked and reflected by a wall from the housing of the fluid container, reflection of which may be received by the receiver, thereby the reception of the light beam being indicative of the presence of the fluid container in the chamber. Alternatively, the receiver may be placed in the wall of the housing of the fluid container, thereby being no reflection. The reception of the light beam from the receiver being indicative of the fluid container in the chamber.

In an example, the detecting optical signal is issued by an emitter, and the detected optical signal is received by a receiver. The emitter and the receiver may be part of an optical sensor 150. In some examples, the emitter and the receiver may be included in a single optical sensor 150. In other examples, the emitter and the receiver may be included in the same or in separate housings. Furthermore, the emitter and the receiver may be located close to each other. In an example, the emitter may be attached to the fix frame 130 and the receiver may be attached to the rotating housing 110. In another example, the emitter may be attached to the rotating housing 110 and the receiver may be attached to the fix frame 130. In yet another example, the emitter and the receiver and attached in the fix frame 130.

Following with the examples above, the detected signal is sent to a controller to determine whether the fluid container is present in the rotating housing 110. In some examples, the controller may also determine whether the rotating housing 110 is in a determined position.

Figure 2:
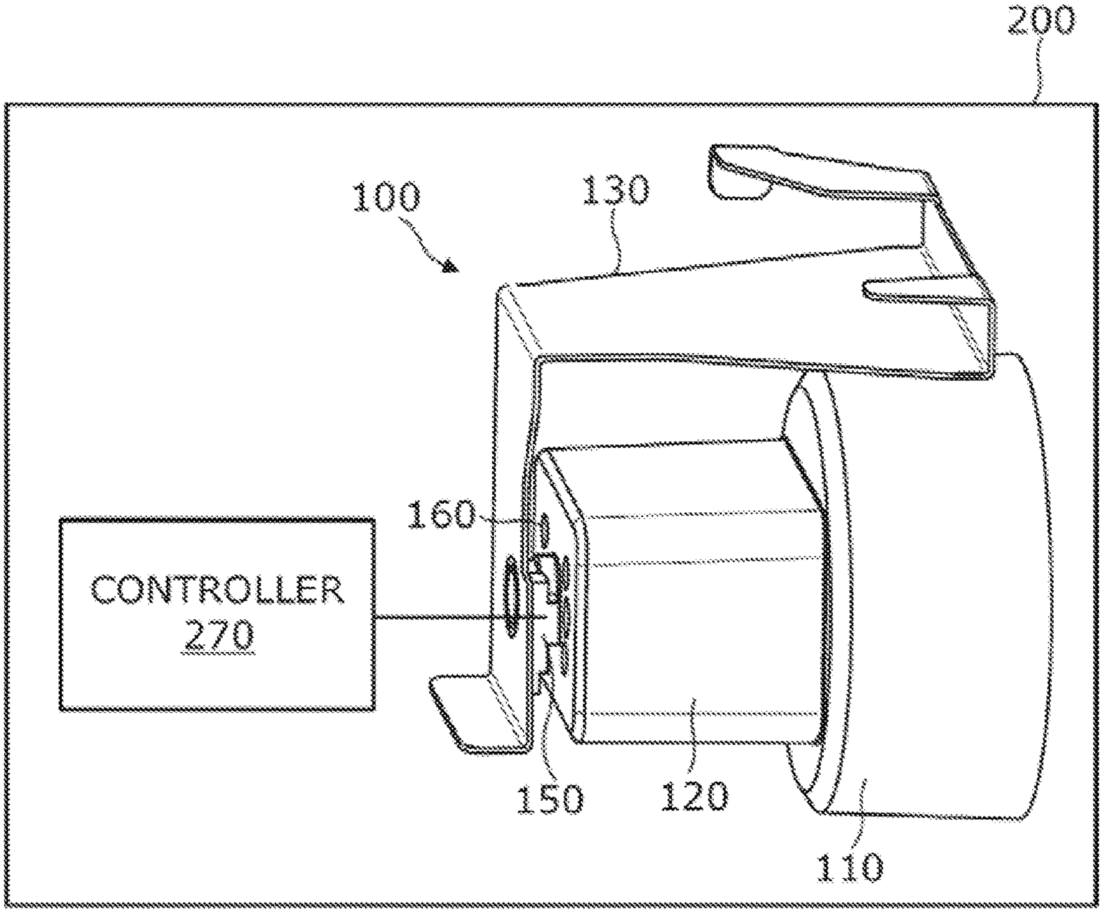
FIG. 2 is a block diagram illustrating an example of a printing apparatus comprising a rotating housing.

FIG. 2 is a block diagram illustrating an example of a printing apparatus 200 comprising a rotating housing 110. The apparatus 200 may include apparatus 100 comprising a rotating housing 110, a side wall 120, a fix frame 130, an optical sensor 150, and a bore 160. The rotating housing 110, the side wall 120, the fix frame 130, the optical sensor 150, and the bore 160 may be the same as or similar to the corresponding elements from FIGS. 1A and 1B.

The apparatus 200 additionally comprises or may be coupled to a controller 270. The controller 270 may be a combination of hardware and programming that may be implemented in a number of different ways. For example, the programming of modules may be processor-executable instructions stored on at least one non-transitory machine-readable storage medium and the hardware for modules may include at least one processor to execute those instructions. In some examples described herein, multiple modules may be collectively implemented by a combination of hardware and programming. In other examples, the functionalities of the controller 270 may be, at least partially, implemented in the form of electronic circuitry.

As mentioned above, the detected signal may be sent to the controller 270. The controller 270 may determine whether a fluid container is present in the rotating housing 110 or not. Additionally, or alternatively, in some examples, the controller 270 may determine whether the rotating housing 110 is in a determined position. The controller 270 may further control the rotating housing 110 to rotate to a position corresponding to the determined position. In an example, the determined position may be a vertical orientation corresponding to a load orientation of the fluid container. In some examples, the controller 270 may further control the rotating housing 110 to rotate the load orientation of the fluid container if the controller 270 previously determined that the fluid container is not present in the rotating housing 110.

Figure 3:
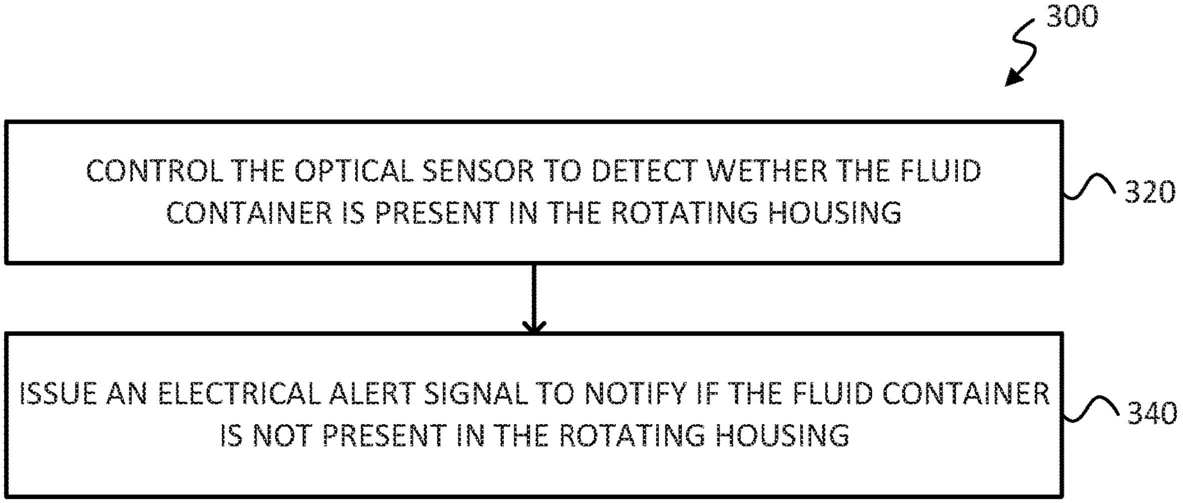
FIG. 3 is a flowchart of an example method for issuing an alert signal.

In other examples, the controller 270 may be to execute the method 300 of FIG. 3 for issuing an alert signal. Additionally, or alternatively, the controller 270 may be to execute method 500 from FIG. 5 and/or method 600 from FIG. 6.

FIG. 3 is a flowchart of an example method 300 for issuing an alert signal. Method 300 may be described below as being executed or performed by a controller, such as the controller 270 of FIG. 2. In some implementations of the present disclosure, method 300 may include more or less blocks than are shown in FIG. 3. In some implementations, some of the blocks of method 300 may, at certain times, be performed in parallel and/or may repeat.

Method 300 may be performed by a controller (e.g., controller 270 from FIG. 2). In some examples, the controller may be part of a printing apparatus. In other examples, the controller may be part of the rotating housing 100.

At block 320, the controller may control the optical sensor (e.g., optical sensor 150 from FIGS. 1A and 1B) to detect whether the fluid container is present in the rotating housing (e.g., rotating housing 110 from FIGS. 1A and 1B). In some examples, the controller may detect whether the fluid container is present in the rotating housing based on the detected optical signal from the receiver.

At block 340, the controller may issue an electrical alert signal to notify if the fluid container is not present in the rotating housing. The electrical alert signal may be sent to an alert device to inform the user that the rotating housing is not present in, for example, apparatus 100. In some examples, the alert device may issue a visual alert device, for example a Light Emitting Diode (LED), screen, tablet or any suitable visual emitting device. In other examples, the alert device may issue an auditive alert device, for example a speaker or any other auditive alert device.

Figure 4A:
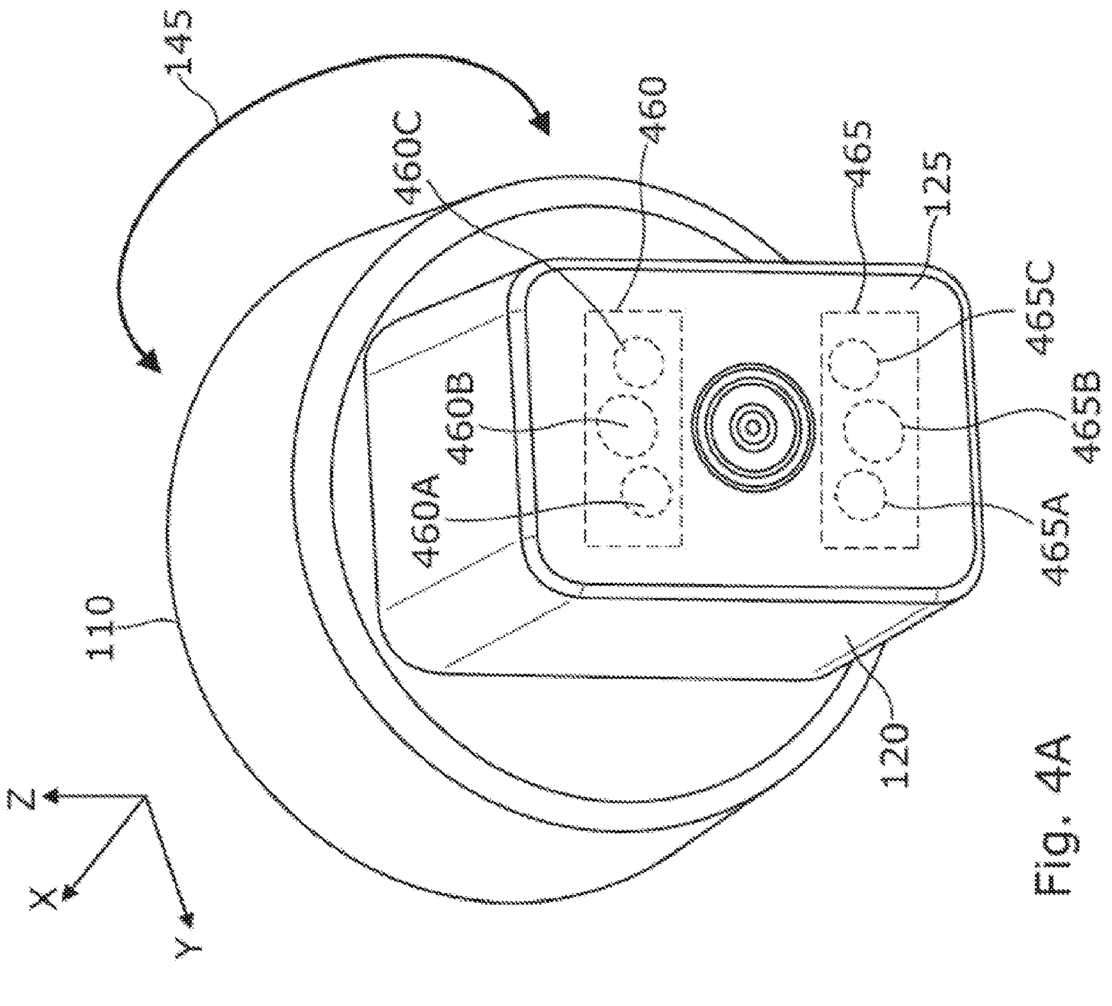
FIG. 4A is a diagram illustrating an example of a back view of an apparatus comprising a rotating housing.
Figure 4B:
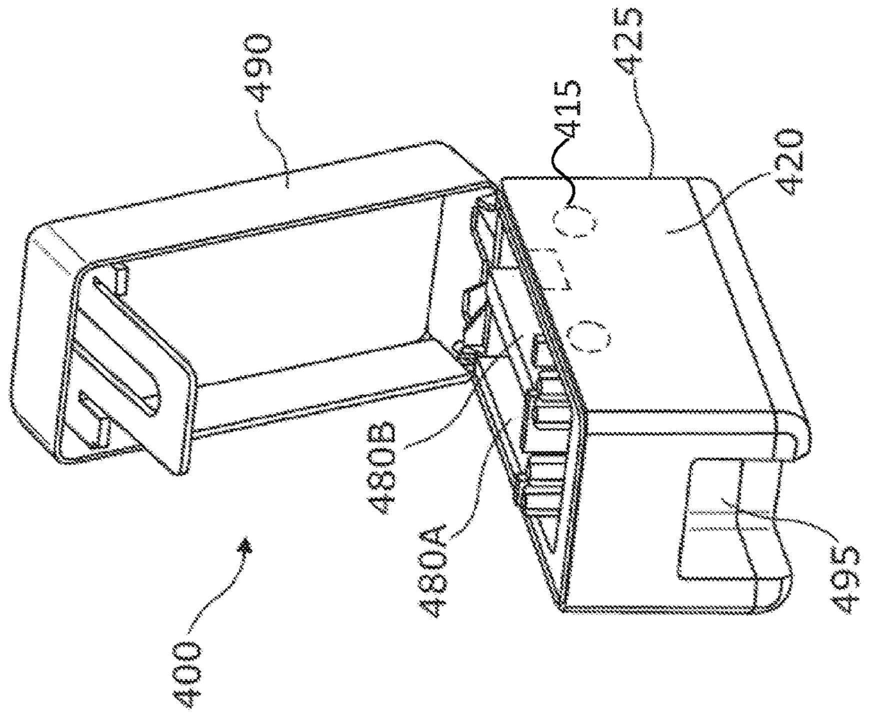
FIG. 4B is a diagram illustrating an example of a fluid container.

The following examples are disclosed with reference to FIGS. 4A and 4B. FIG. 4A is a diagram illustrating an example of a back view of an apparatus comprising a rotating housing 110 to receive a fluid container. FIG. 4B is a diagram illustrating an example of an isometric view of the fluid container 400.

FIG. 4A shows an example rotating housing 110 that rotates as indicated by arrow 145. The rotating housing comprises a side wall 120 and a back wall 125. In some examples, the back wall 125 of the rotating housing 110 is to be connected to a fix frame (e.g., fix frame 130 from FIGS. 1A and 1B).

FIG. 4B shows an example of a fluid container 400. The fluid container 400 comprises a side wall 420 at a side of the fluid container 400, and a back wall 425 at the back side of the fluid container 400. The fluid container 400 comprises a base at the bottom part of the fluid container 400. In some examples, the fluid container 400 may also comprise a lid 490 to close the container from a top opening.

The fluid container 400 is to be introduced in the chamber defined by the inner wall of the rotating housing 110 through an opening (e.g., opening indicated by arrow 140 from FIGS. 1A and 1B). In some examples, for ease of the introduction and/or removal of the fluid container 400 to the rotating housing 110, the fluid container 400 may further comprise a handle 495. In an example, once the fluid container 400 is installed in the rotating housing 110, the side wall 420 from the fluid container 400 may be associated with the side wall 120 from the rotating housing 110, and the back wall 425 from the fluid container 400 may be associated with the back wall 125 from the rotating housing 110.

In an example, the fluid container 400 may comprise a slot to host a printhead therein. The printhead may be introduced in a slot of the fluid container 400 through an opening. In additional examples, the fluid container 400 may comprise a plurality of slots to host a plurality of printheads therein. For example, the fluid container 400 may comprise a first printhead slot 480A to host a first printhead and a second printhead slot 480B to host a second printhead.

The rotating housing 110 from FIG. 4A comprises a plurality of bores 460. In the illustrated example, the first plurality of bores 460 comprises first bore 460A, a second bore 460B, and a third bore 460C. An example of plurality of bores 460 has been illustrated, however the plurality of bores 460 may comprise more or less bores than the ones illustrated without departing from the scope of the present disclosure.

As disclosed above, the fluid container 400 from FIG. 4B may be introduced into the rotating housing 110 from FIG. 4A. In some examples, the fluid container 400 may have a plurality of bores 415 (illustrated as dotted lines on the back wall 425 from the fluid container 400), corresponding to the first plurality of bores. In an example, a bore from the first plurality of bores 460 from the back side 125 of the rotating housing 110, may be associated with a bore from the plurality of bores 415 from the fluid container 400, in such a way that a detecting signal and/or a detected signal may be allowed to travel through the bore from the first plurality of bores 460 and the bore from the plurality of bores 415. In other examples, the fluid container 400 may not have a back side 425, thereby being an open end in which a detecting signal and/or a detected signal may be allowed to travel though the bore from the plurality of bores 460 and the open end respective to the back side 425.

In some examples, the back wall 425 from the fluid container 400 may comprise a bore associated with a printhead slot, in such a way that a detecting signal may travel through the bore to be blocked and/or reflected by the back side of the printhead housing (not shown). In the examples in which there is not any printhead in the printhead slot, the detecting signal may travel through the bore and through the printhead slot to be blocked and/or reflected by the inner side of the front wall of the fluid container 400. The detected optical signal associated with the detecting signal of the previous examples may enable a controller (e.g., controller 270 from FIG. 2) to determine whether the printhead is present in the printhead slot or if the printhead is not present in the printhead slot.

In additional examples, the back wall 425 from the fluid container 400 may comprise a plurality of bores 415 associated with a plurality of printhead slots. In an example, the plurality of bores 415 from the back side 425 of the fluid container 400 may comprise a first bore associated with the first printhead slot 480A, and a second bore associated with the second printhead slot 480B. The plurality of bores 460 on the back side 125 of the rotating housing 110 causes the detected optical signal to include a plurality of signal pulses indicative of a position (i.e. orientation) of the rotating housing, for example, Additionally, the back side 125 of the rotating housing 110 may, for example, further comprise an additional plurality of bores 465 illustrated in dotted lines. The additional plurality of bores 465 may be located in a symmetrical location with respect to a horizontal axis from the plurality of bores 460. The additional plurality of bores 465 enables the detected signal to be received by a controller (e.g., controller 270 from FIG. 2) in such a way that the controller is to control or determine the position of the rotating housing 110 (e.g., a vertical position corresponding to the printhead loading position) in a more precise way.

Figure 5:
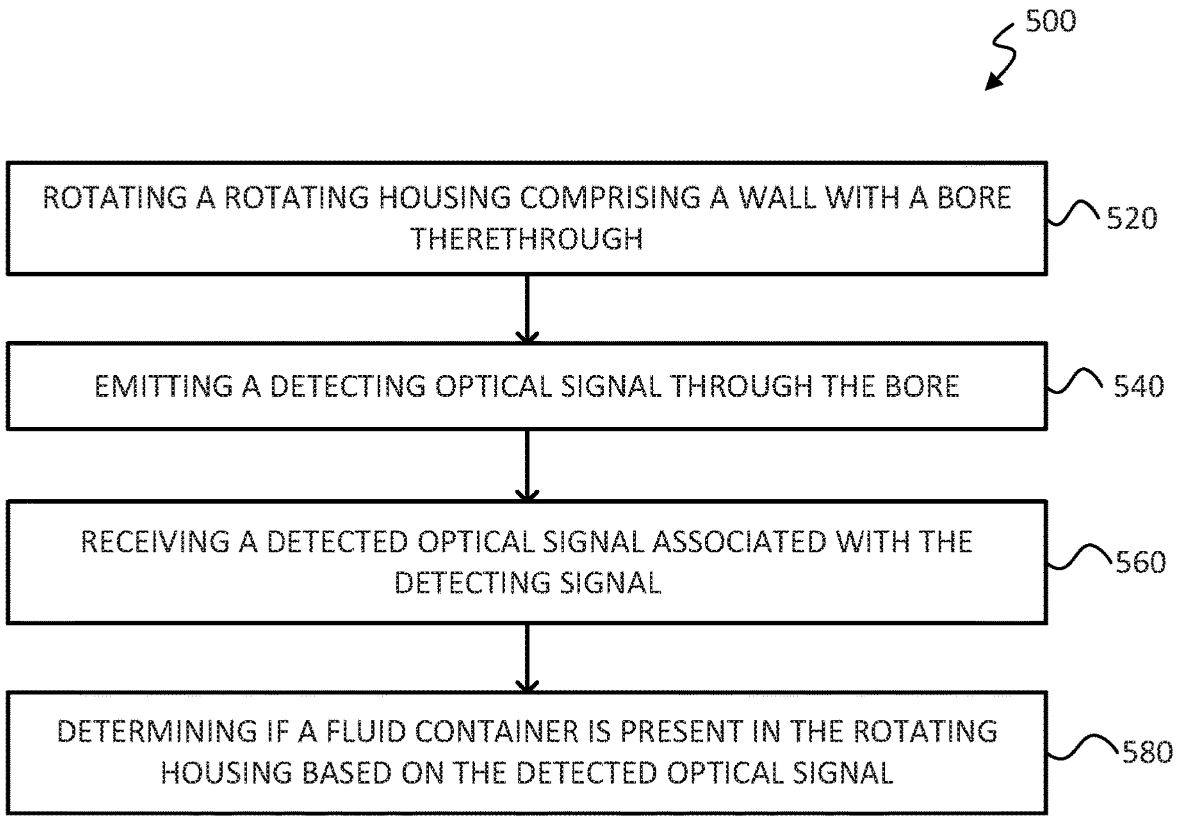
FIG. 5 is a flowchart of an example method for determining if a fluid container is in a rotating housing.

FIG. 5 is a flowchart of an example method 500 for determining if a fluid container (e.g., fluid container 400 from FIG. 4B) is in a rotating housing (e.g., rotating housing 110 from FIGS. 1A and 1B). Method 500 may be described below as being executed or performed by a controller, such as the controller 270 of FIG. 2.

At block 520, the controller may instruct the rotating housing (e.g., rotating housing 110 from FIGS. 1A and 1B). The rotating housing comprises a wall with a bore therethrough (e.g., wall 125 and bore 160 from FIGS. 1A and 1B). At block 540, the controller may instruct an emitter sensor (e.g., optical sensor 150 from FIGS. 1A and 1B) to emit a detecting optical signal through the bore. At block 560, the controller may instruct a receiver sensor to detect an optical signal associated with the detecting signal. In some examples, the receiver may be integrated in the same sensor as the emitter. At block 580, the controller may determine if the fluid container is present in the rotating housing based on the detected optical signal.

Figure 6:
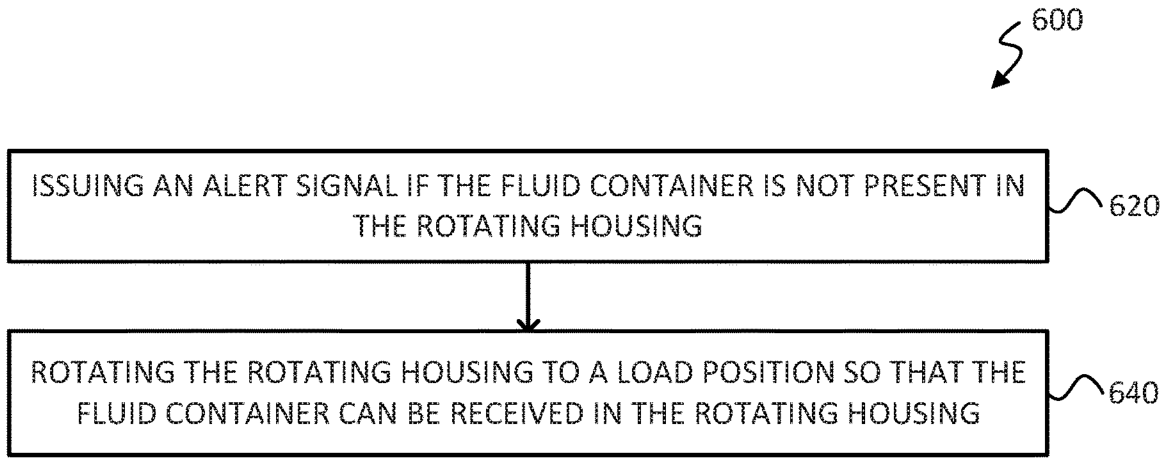
FIG. 6 is a flowchart of an example of another method for rotating a rotating housing.

FIG. 6 is a flowchart of an example method 600 for rotating a rotating housing. Method 600 may be described below as being executed or performed by a controller, such as the controller 270 of FIG. 2.

At block 620, the controller may issue an alert signal if the fluid container (e.g., fluid container 400 from FIG. 4B) is not present in the rotating housing (e.g., rotating housing 110 from FIGS. 1A and 1B). At block 640, the controller may instruct the rotating housing to rotate to a load position (e.g., position in FIG. 4A) so that the fluid container can be received in the rotating housing.

The above examples may be implemented by hardware, or software in combination with hardware. For example, the various methods, processes and functional modules described herein may be implemented by a physical processor (the term processor is to be implemented broadly to include CPU, SoC, processing module, ASIC, logic module, or programmable gate array, etc.). The processes, methods and functional modules may all be performed by a single processor or split between several processors; reference in this disclosure or the claims to a "processor" should thus be interpreted to mean "at least one processor". The processes, method and functional modules are implemented as machine-readable instructions executable by at least one processor, hardware logic circuitry of the at least one processors, or a combination thereof.

As used herein, the terms "about" and "substantially" may be used to provide flexibility to a numerical range endpoint by providing that a given value may be, for example, an additional 20% more or an additional 20% less than the endpoints of the range. The degree of flexibility of this term can be dictated by the particular variable and would be within the knowledge of those skilled in the art to determine based on experience and the associated description herein. In some examples herein, the terms "about" and "substantially" may be used to provide flexibility to a relative position and/or an absolute position.

The drawings in the examples of the present disclosure are some examples. It should be noted that some units and functions of the procedure may be combined into one unit or further divided into multiple sub-units. What has been described and illustrated herein is an example of the disclosure along with some of its variations. The terms, descriptions and figures used herein are set forth by way of illustration. Many variations are possible within the scope of the disclosure, which is intended to be defined by the following claims and their equivalents.

Example implementations can be realized according to the following sets of features:

Feature set 1: An apparatus comprising:

a rotating housing comprising a wall with an inner side defining a chamber and an outer side, the wall having a bore communicating the inner side and the outer side, the chamber being to receive a fluid container;

a fix frame holding the rotating housing;

an optical sensor comprising an emitter to issue a detecting optical signal through the bore and a receiver to receive a detected optical signal associated to the detecting optical signal; and wherein the detected signal is sent to a controller to determine whether the fluid container is present in the rotating housing.

Feature set 2: An apparatus with feature set 1, further comprising the controller to:

control the optical sensor to detect whether the fluid container is present in the rotating housing; and issue an electrical alert signal to notify if the fluid container is not present in the rotating housing.

Feature set 3: An apparatus with feature set 1 or 2, further comprising the fluid container and wherein the fluid container comprises a slot to host a printhead.

Feature set 4: An apparatus with any of feature sets 1 to 3, wherein the rotation wheel further comprises a plurality of slots, each slot to host a printhead; and a plurality of bores, wherein each bore is associated with a slot.

Feature set 5: An apparatus with any of feature sets 1 to 4, wherein the plurality of bores causes the detected optical signal to include a plurality of signal pulses indicative of a position of the rotating housing.

Feature set 6: An apparatus with any of feature sets 1 to 5, further comprising an additional plurality of bores on the wall, being the additional plurality of bores symmetrical with respect to the plurality of bores.

Feature set 7: An apparatus with any of feature sets 1 to 6, further comprising a controller to control the rotating housing to rotate to a position corresponding to a load orientation of the fluid container.

Feature set 8: An apparatus with any of feature sets 1 to 7, wherein one of the emitter or the receiver is attached to the fix frame and the other of the emitter or the receiver is attached to the rotating housing.

Feature set 9: An apparatus with any of feature sets 1 to 8, wherein the emitter and the receiver are attached to the fix frame.

Feature set 10: An image recording system comprising:

a rotating wheel comprising a wall defining a chamber to receive a printing fluid container; and a sensing device comprising an emitter to emit a detecting optical signal through a bore on the wall and a receiver to receive a detected optical signal associated with the detecting signal to detect that the printing fluid container is present in the rotating wheel.

Feature set 11: An image recording system with feature set 10, further comprising a controller to: control the sensing device to detect whether the printing fluid container is present in the rotating wheel; and issue an electrical alert signal to notify if the printing fluid container is not present in the rotating wheel.

Feature set 12: An image recording system with any of feature sets 10 to 11, further comprising the printing fluid container and wherein the printing fluid container comprises a slot to host a printhead.

Feature set 13: An image recording system with any of feature sets 10 to 12, wherein the rotating wheel comprises: a plurality of slots, each slot to host a printhead; a plurality of bores, wherein each bore is associated with a slot; and wherein the plurality of bores causes the detected optical signal to include a plurality of signal pulses indicative of a position of the rotating wheel.

Feature set 14: A method comprising:

rotating a rotating housing comprising a wall with a bore therethrough;

emitting, by an emitter, a detecting optical signal through the bore;

receiving, by a receiver, a detected optical signal associated with the detecting signal; and determining if a fluid container is present in the rotating housing based on the detected optical signal.

Feature set 15: A method with feature set 14, further comprising: issuing an alert signal if the fluid container is not present in the rotating housing; and rotating the rotating housing to a load position so that the fluid container can be received in the rotating housing.

What it is claimed is:

1. An apparatus comprising:

a rotating housing comprising a wall with an inner side defining a chamber and an outer side, the wall having a bore communicating the inner side and the outer side, the chamber being to receive a fluid container;

a fix frame holding the rotating housing;

an optical sensor comprising an emitter to issue a detecting optical signal through the bore and a receiver to receive a detected optical signal associated to the detecting optical signal; and wherein the detected signal is sent to a controller to determine whether the fluid container is present in the rotating housing.

2. The apparatus of claim 1, further comprising the controller to:

control the optical sensor to detect whether the fluid container is present in the rotating housing; and issue an electrical alert signal to notify if the fluid container is not present in the rotating housing.

3. The apparatus of claim 1, further comprising the fluid container and wherein the fluid container comprises a slot to host a printhead.

4. The apparatus of claim 3, wherein the rotating housing further comprises:

a plurality of slots, each slot to host a printhead; and a plurality of bores, wherein each bore is associated with a slot.

5. The apparatus of claim 4, wherein the plurality of bores causes the detected optical signal to include a plurality of signal pulses indicative of a position of the rotating housing.

6. The apparatus of claim 5, further comprising an additional plurality of bores on the wall, being the additional plurality of bores symmetrical with respect to the plurality of bores.

7. The apparatus of claim 1, further comprising a controller to control the rotating housing to rotate to a position corresponding to a load orientation of the fluid container.

8. The apparatus of claim 1, wherein one of the emitter or the receiver is attached to the fix frame and the other of the emitter or the receiver is attached to the rotating housing.

9. The apparatus of claim 1, wherein the emitter and the receiver are attached to the fix frame.

10. An image recording system comprising:

a rotating wheel comprising a wall defining a chamber to receive a printing fluid container; and a sensing device comprising an emitter to emit a detecting optical signal through a bore on the wall and a receiver to receive a detected optical signal associated with the detecting signal to detect that the printing fluid container is present in the rotating wheel.

11. The image recording device of claim 10, further comprising a controller to:

control the sensing device to detect whether the printing fluid container is present in the rotating wheel; and issue an electrical alert signal to notify if the printing fluid container is not present in the rotating wheel.

12. The image recording device of claim 10, further comprising the printing fluid container and wherein the printing fluid container comprises a slot to host a printhead.

13. The image recording device of claim 12, wherein the rotating wheel comprises:

a plurality of slots, each slot to host a printhead;

a plurality of bores, wherein each bore is associated with a slot; and wherein the plurality of bores causes the detected optical signal to include a plurality of signal pulses indicative of a position of the rotating wheel.

14. A method comprising:

rotating a rotating housing comprising a wall with a bore therethrough;

emitting, by an emitter, a detecting optical signal through the bore;

receiving, by a receiver, a detected optical signal associated with the detecting signal; and determining if a fluid container is present in the rotating housing based on the detected optical signal.

15. The method of claim 14, further comprising:

issuing an alert signal if the fluid container is not present in the rotating housing; and rotating the rotating housing to a load position so that the fluid container can be received in the rotating housing.

* * * * *